United States Patent [19]

Hasegawa

[11] Patent Number: 5,424,889
[45] Date of Patent: Jun. 13, 1995

[54] ROTARY HEAD DRUM ARRANGEMENT

[75] Inventor: Shinichi Hasegawa, Chiba, Japan

[73] Assignee: Sony Corporation, Tokyo, Japan

[21] Appl. No.: 263,006

[22] Filed: Jun. 20, 1994

Related U.S. Application Data

[63] Continuation of Ser. No. 888,502, May 27, 1992, abandoned.

[30] Foreign Application Priority Data

Jun. 5, 1991 [JP] Japan .................. 3-133123

[51] Int. Cl.[6] .......................... G11B 5/56; G11B 5/52
[52] U.S. Cl. ...................... 360/107; 360/109
[58] Field of Search .................. 360/109, 107

[56] References Cited

U.S. PATENT DOCUMENTS

| | | | |
|---|---|---|---|
| 4,086,638 | 4/1978 | Saito | 360/109 |
| 4,497,005 | 1/1985 | Heinz | 360/109 |
| 4,616,280 | 10/1986 | Kobayashi et al. | 360/109 |
| 4,658,316 | 4/1987 | Narita | 360/109 |
| 4,672,489 | 6/1987 | Wada et al. | 360/109 |
| 4,882,635 | 11/1989 | Sanai | 360/109 |
| 4,897,745 | 1/1990 | Binder-Kriegelstein | 360/109 |
| 5,050,024 | 9/1991 | Nanjyo | 360/109 |
| 5,159,510 | 10/1992 | Saito | 360/109 |
| 5,173,820 | 12/1992 | Yoneda | 360/107 |

Primary Examiner—John H. Wolff
Assistant Examiner—George J. Letscher
Attorney, Agent, or Firm—William S. Frommer; Alvin Sinderbrand

[57] ABSTRACT

A rotary magnetic head drum arrangement comprises a lower fixed drum with an upper rotatable drum mounted thereon. A head base member is mounted in a base portion of the upper rotatable drum such that a flexible head mounting portion of the head base member is positioned across a fulcrum. A pairing adjustment screw is provided at a predetermined adjustment point for exerting pressure on the head mounting portion at a point thereon remote from the fulcrum for changing a position of a magnetic head secured on the head mounting portion. A distance between the fulcrum and the adjustment point is made to be longer than a distance between the fulcrum and the head on the head mounting portion.

8 Claims, 3 Drawing Sheets

ROTARY HEAD DRUM ARRANGEMENT

This application is a continuation of application Ser. No. 07/888,502, filed May 27 1992, now abandoned.

BACKGROUND OF THE INVENTION

1. Field of The Invention

The present invention relates generally to a rotary head drum, such as is commonly used in a video tape recorder (VTR).

2. Description of The Prior Art

A rotary head drum arrangement is well known for use in recording and reading image data in a VTR, for example. Such head drum arrangement generally employs a rotary magnetic head which is part of a motor driven head drum assembly utilized in recording and playback of a video signal to and from magnetic tape. In such an arrangement, a head tip of a magnetic head mounted in the rotary drum, is inclined slightly in respect to the running direction of the tape. With a normal, helical scan type head drum arrangement, image data is recorded on the tape in diagonal bands or tracks.

FIG. 4 shows an example of a rotatable head drum arrangement 1 of a helical scan type which comprises a rotary drum body 10 for rotatably mounting a magnetic head 16 and which defines an outer circumferential surface 10a from which a tip end of the magnetic head 16 projects slightly. The rotary drum body 10 is rotatably mounted on a spindle 21 via bearings 22, which may be ball bearings or the like. The rotary drum body 10 is mounted by way of the spindle 21 on a stationary drum 20 for rotating relative thereto. A rotor 31 is associated with a portion of the rotary drum body 10 and spaced by a predetermined gap from a stator 35 associated with said spindle 21. The rotor 31 and stator 35 comprise main components of a motor 30 for driving the head drum arrangement 1.

Further, during recording or playback operation of the head drum arrangement, a rotary transformer 40 is utilized for transmitting signals to and from the rotary drum body 10. The rotary transformer 40 comprises a transformer member 41 fixed to a lower portion of the rotary drum body 10 and opposing a second transformer member 42 fixed to an upper portion of the stationary drum 20.

Further, a rotary flange 12 is attached around outer races of the bearings 22 and is affixed to a drum base 11 of the rotary drum body 10 by a bolt 13. At a lower side 11a of the drum base 11 a head base member 15 is affixed via a mounting screw 14. At the outer end of the head base member 15, that is, a portion extending to the outer circumference of the cylindrical shaped rotary drum body 10, the magnetic head 16 is mounted. The drum base 11 includes a cut-out 11c at the outer circumferential surface 10a of the rotary drum body 10 for allowing the magnetic head 16 to project therethrough. A pairing adjustment screw 17 is provided in the drum base 11 for exerting downward pressure at substantially a center portion of the head base member 15, and such pressure is adjustable for determining a height of the head 16. An annular terminal plate 18 is associated with the flange 12, and includes an elastic, reverse C-shaped contact portion 19, for electrically connecting the head 16.

The rotor 31 (or yoke) of the motor 30 of the drum assembly 1 is substantially disk shaped, and an upper surface 11b of the drum base 11 receives a bolt 33 therethrough for securing the rotor 31 thereto. The rotor 31 has an annular magnet 32 affixed thereto. Further, the stator 35 (yoke) is associated with a second flange 37 connected to an upper part of the spindle 21. The stator 35, the second flange 37 and a back yoke 34 are secured together by a retaining screw 38. A lower surface of the stator 35 is provided with a coil portion 36, spaced from the magnet 32 with a predetermined clearance therebetween.

The back yoke 34 is a substantially disk shaped cap portion which covers a top portion of the rotary drum body 10. The rotary head drum assembly further includes a terminal plate 39 located at an upper portion of the spindle 21 and coupled with the stator 35. Above the back yoke 34, and also retained by the bolt 38, there are a flexible circuit substrate 50 and a guide protector 51.

The lower, cylindrical stationary drum 20 has an inclined groove 20a formed in the outer circumference thereof for helically guiding magnetic tape (not shown) around the head drum. The stationary drum 20 further includes a lower drum base 20b supporting the fixed transformer member 42. At a lower part of the lower drum base 20b, below the fixed transformer member 42, a pin 23 is coupled with a terminal plate 24 for interconnecting the transformer member 42 with a second flexible circuit substrate (not shown). Furthermore, the lower drum base 20b has a central bore 20c with a diameter which is substantially equal to that of the spindle 21 for firmly retaining the spindle by press fitting thereof.

For head pairing control a threaded opening 11d is provided in the drum base 11 for receiving the pairing adjustment screw 17. The pairing adjustment screw includes a tip end portion 17a exerting downward pressure on the head base 15 which is retained by the mounting screw 14. By this arrangement, the head base may be urged flexibly downward for adjusting the height (pairing) of the head 16.

FIG. 5 shows a conventional head base such as is generally mounted under the drum body 10 of the conventional head drum assembly 1 described above. The mounting screw 14 represents a fixed point, or fulcrum A on FIG. 6, while the head 16 represents a controlled edge B and the point at which the tip end 17a of the pairing adjustment screw 17 applies pressure to the head base 15 represents a leverage point C. As may be seen from FIG. 6, control of head position is effected by applying leverage (pressure) to the leverage point C between the fixed end (fulcrum A) and the controlled edge B for changing the head position. According to this construction, a distance from the leverage point C to the fulcrum A is shorter than a distance from the controlled edge B to the fulcrum A. Thus, during pairing adjustment, the deflection of the controlled edge ($L_B$) is greater than the deflection of the leverage point ($L_C$), that is to say, $L_B) > L_C$. However, in this condition, very fine adjustment such as is required for a 8 mm video cassette recorder for example, cannot be readily accomplished. Further, backlash, etc., of the pairing adjustment screw 17 may occur, causing slippage of a leading edge 16a of the head 16 and, according to the above described construction, accurate pairing adjustment is difficult and time consuming.

Further, as seen in FIG. 5, the head base may mount two heads having predetermined azimuth angles in a so called double azimuth arrangement, and this arrangement presents the same problems as the above described single azimuth arrangement.

Therefore, it has been required recently to provide a small, precisely adjustable rotary head assembly which is capable of very fine adjustments.

SUMMARY OF THE INVENTION

It is therefore a principal object of the present invention to avoid the above described drawbacks of the prior art.

It is a further object of the present invention to provide a rotary head drum arrangement in which pairing adjustment can be accomplished with a high degree of accuracy and a minimum of difficulty.

In order to accomplish the aforementioned and other objects in accordance with an aspect of this invention, a rotary head drum arrangement comprises a rotary body, at least one head, a head base member having a head mounting portion for each head and being fixed to the rotary body so as to project the head slightly beyond the outer circumferential surface of the rotary body, a fulcrum on the rotary body for each head mounting portion of the head base member and which is spaced a first distance from the head secured thereon and about which the respective head mounting portion is rockably flexible for positionally adjusting the respective head in directions generally parallel with the central axis of the rotary body, and an adjustment member, such as a screw, for each head mounting portion and being movable relative to the rotary body to act on the respective head mounting portion at a location spaced from the respective fulcrum by a second distance which is substantially greater than the first distance, whereby relatively large or gross movements of each adjustment member can effect relatively fine positional adjustments of the respective head.

DESCRIPTION OF THE PREFERRED EMBODIMENT

Figure 1:
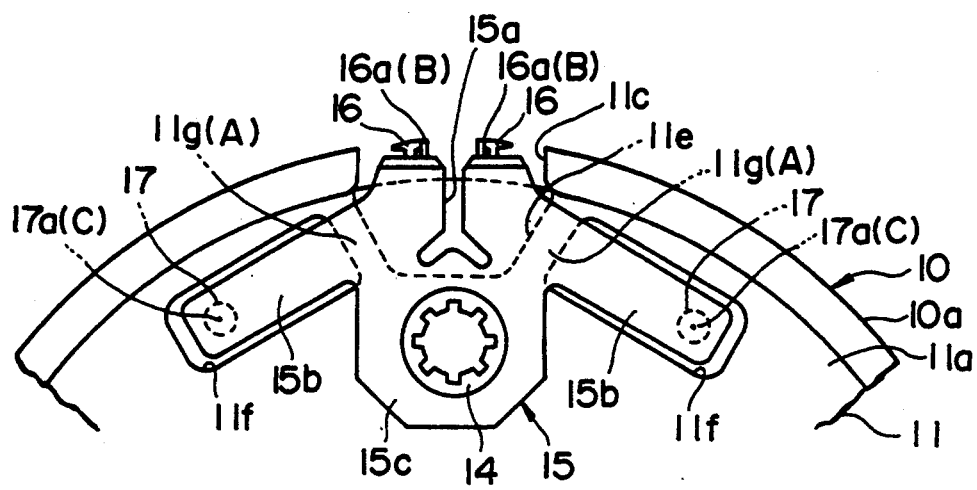
FIG. 1 is a fragmentary plan view of tape reading heads and a head base member of a rotary head drum arrangement according to a first embodiment of the invention as viewed from below.

The first embodiment of the invention is applied to a rotary head for a VTR, such as an 8 mm video tape recorder, for example. As shown particularly in FIG. 1, heads 16' and 16" are mounted by means of a head base member 15' in a magnetic rotary head drum arrangement that is otherwise generally similar to that described with reference to FIG. 4 and which comprises a rotary drum body 10', with an outer circumferential surface, 10'a. The rotary drum body 10' surrounds a drum base 11' having a planar under surface 11'a. The rotary drum body 10' includes openings defined by cut-outs 11'c which correspond to the location of depressions 11'e formed in the underside of the drum base 11'. At opposite sides of each depression 11'e, rectangular depressions 11'f, 11"f are formed and, bridging portions or ridges 11'g and 11"g are present between the depression 11e and the depressions 11'f and 11"f, respectively.

The head base member 15' is formed of a spring plate material and is shown to include a central portion or body 15'c through which a screw 14' extends into the drum base for securing the member 15' to the latter, and converging arms 15'b and 15"b or head mounting portions connected to the central portion 15'c and having adjacent ends from which heads 16' and 16", respectively, project at the upper surface of the head base member 15'. The heads 16', 16", have edge portions 16'a, 16"a at their facing sides The head mounting portions 15'b, 15"b extend over the ridges 11'g, 11"g between the recess 11'e and the recesses 11'f, 11"f. An inverted Y-shaped slot 15'a separates the adjacent ends of the arms or head mounting portions 15'b, 15"b from each other and from the central portions 15'c of the head base member 15' so that the head mounting portions 15'b, 15"b can be rockably flexible about the ridges 11'g, 11'g which form fulcrums therefor, as at A in FIG. 2.

Adjustments screws 17' and 17" are threaded downwardly through the drum base 11' and have lower end tips 17'a, 17"a bearing from above on the head mounting portions or arms 15'b, 15"b, respectively, at locations adjacent the ends of such arms remote from the heads 16', 16". Since the head mounting portions or arms 15'b, 15"b are rockably flexible or resilient about the ridges or fulcrums 11'g, 11"g, axial adjustments of the screws 17', 17" are effective to adjust the positions of the respective heads 16', 16" in directions generally parallel to the axis of the drum body 10'. Further, since the ridges or fulcrums 11'g, 11"g are relatively angled, as shown, the described resilient rocking of the head mounting portions 15'b, 15"b also adjusts the azimuth angles of the respective heads 16', 16".

Figure 2:
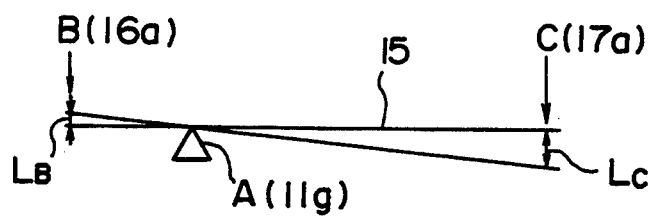
FIG. 2 is an explanatory diagram illustrating pairing characteristics of the rotary head drum arrangement according to the first embodiment of the invention.

It will be appreciated that, with the above structure, wherein the head mounting portions 15'b, 15"b are rocked by pairing adjustment screws 17', 17" about fulcrums A constituted by the ridges 11'g, 11"g, pairing adjustment, or adjustments of the height of the heads 16', 16" is possible Referring now to FIG. 2, in which A represents the fulcrum point established by the ridge 11'g or 11"g, B represents the controlled edge 16'a or 16"a of the head 16' or 16", and C represents a so-called leverage point at which the tip 17'a or 17"a of the pairing adjustment screw 17' or 17" acts on the head mounting portion 15'b or 15"b it is to be noted that, in accordance with the present invention, the three points A, B and C are relatively located such that a distance $D_1$, between the leverage point C and the fulcrum A is longer than a distance $D_2$ between a controlled edge B and the fulcrum A.

With a rotary head drum arrangement to the above described embodiment of the invention, setting a head mounting for effecting pairing adjustment, involves the steps described hereinbelow. First, a head angle, R-balance, and the like as well as an amount of projection of each head beyond the surface 10'a are set. Then, the head base member 15' is mounted on the surface 11'a of the drum base 11' of the head drum 10' via the mounting screw 14'. Head height adjustment (pairing) may be accomplished by suitably turning the pairing adjustment screws 17', 17" for resiliently flexing the head mounting portions 15'b, 15"b in the upward and downward directions about the fulcrums 11'g, 11"g. According to the movements of the head mounting portions 15'b, 15"b, the edges 16'a, 16"a of the heads 16', 16" are caused to move to vary the heights thereof.

As mentioned hereinabove, with reference to FIG. 2, in accordance with this invention, the three points A, B and C are established such that a distance $D_1$ between the leverage point C and the fulcrum A is longer than a distance $D_2$ between a controlled edge B and the fulcrum A. Thus, a deflection $L_C$ occurring at the leverage point C, is greater than a corresponding deflection $L_B$ of the controlled edge B, that is, $L_B < L^C$. Accordingly, a very fine adjustment of each head 16' or 16" (for example, of a few microns) may be easily accomplished. Further, by provision of the pairing adjustment screws 17, even if abrasion etc., occurs over long term use, the screws may be adjusted to move the head or heads to the correct height and suitable pairing adjustment may be maintained over a long period of use.

Figure 4:
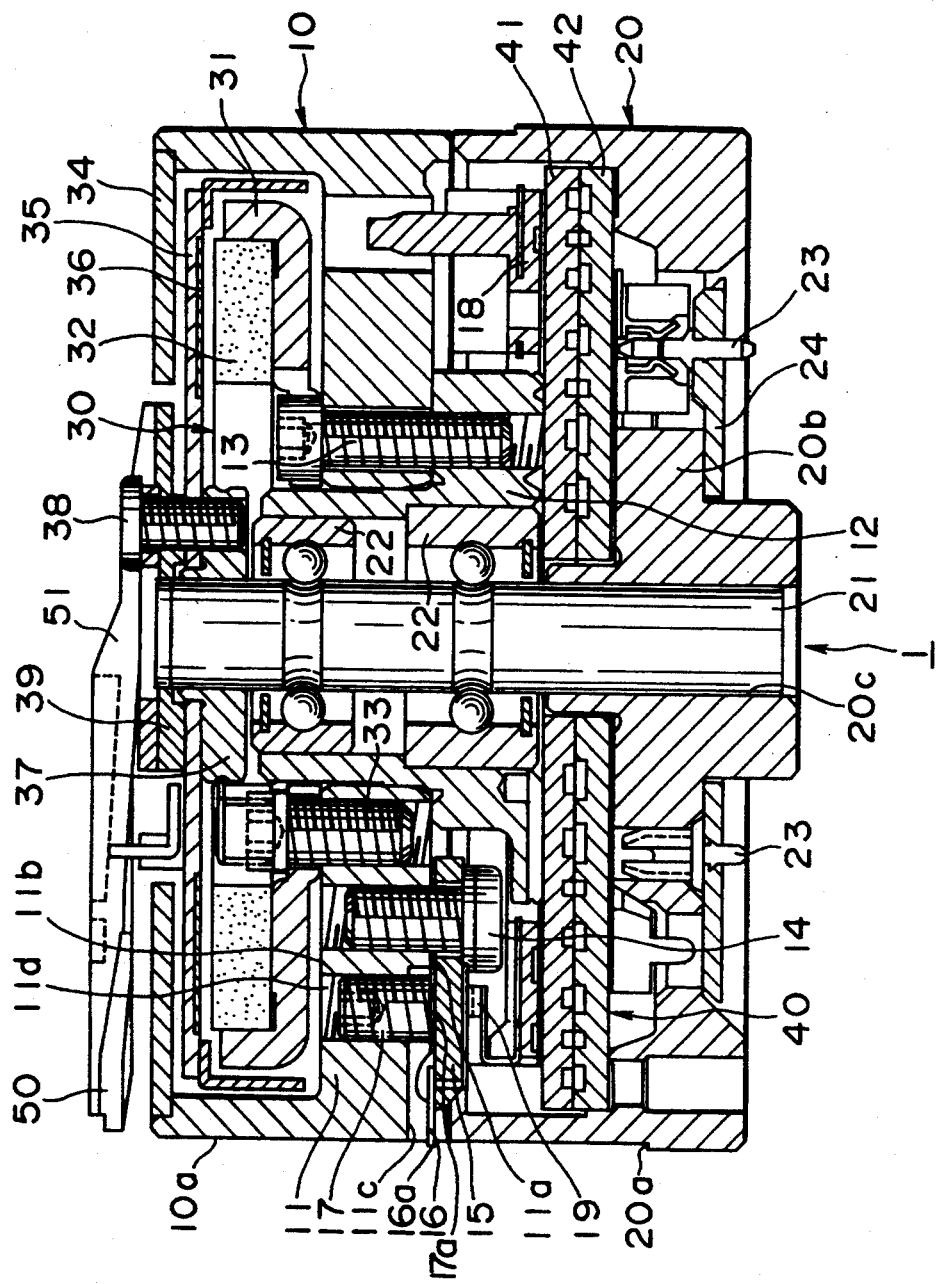
FIG. 4 is a cross-sectional view of a conventional rotary magnetic head drum arrangement.
Figure 5:
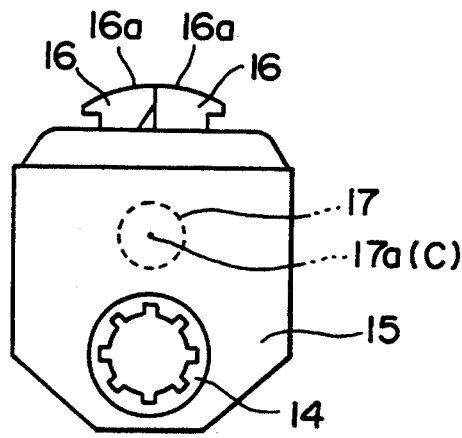
FIG. 5 shows a fragmentary plan view of a conventional head base member in the rotary magnetic head drum arrangement of FIG. 4.
Figure 6:
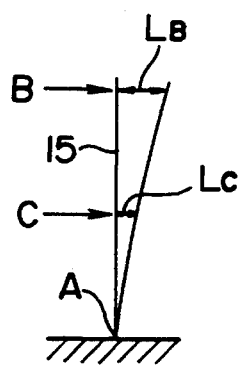
FIG. 6 is an explanatory diagram illustrating pairing characteristics of the conventional rotary magnetic head drum arrangement shown in FIGS. 4 and 5.

In the above described embodiment, the invention is shown applied to an arrangement in which a rotating drum body 10' is mounted over a lower fixed drum, as at 20 on FIG. 4, but it is apparent that the invention may be similarly applied to a so-called propeller type disk apparatus.

Figure 3:
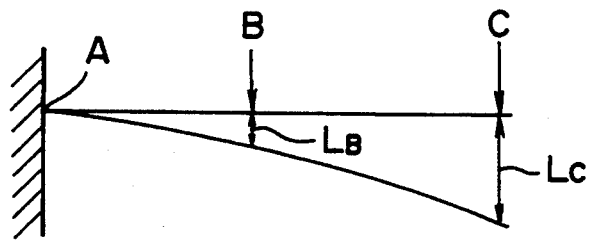
FIG. 3 is an explanatory diagram illustrating pairing characteristics for an alternative embodiment of the rotary head drum arrangement according to the invention.

Further, as shown in FIG. 3, the invention may be employed for optimally effecting pairing adjustment in a case where the controlled edge of the head (controlled edge position B) is situated between a fulcrum (fulcrum A) and the leverage point (leverage point C). In the case of such alternative arrangement, as in the previous embodiment, a distance $D'_1$ between the fulcrum A and the leverage point C is greater than a distance $D'_2$ between the fulcrum A and the controlled edge B.

Thus, according to the present invention, with a simple construction, minute and accurate adjustment of pairing may be accomplished with high reliability even over long periods of use.

While the present invention has been disclosed in terms of preferred embodiments thereof in order to facilitate better understanding thereof, it should be appreciated that the invention can be embodied in various ways without departing from the principle of the invention. Therefore, the invention should be understood to include all other possible embodiments and modifications of the illustrated embodiments which can be devised without departing from the principles of the invention as set forth in the appended claims.

What is claimed is:

1. A rotary head drum arrangement comprising:
    a rotary drum body rotatable about a central axis and having a cylindrical outer circumferential surface;
    at least one head;
    a head base member having a head mounting portion for each said head and to which the latter is secured;
    means for securing said head base member on said rotary drum body so as to project each said head slightly beyond said outer circumferential surface;
    means on said rotary drum body defining a fulcrum for each said head mounting portion which is spaced a first distance from said head secured thereon and about which the respective head mounting portion of the base member is rockably flexible relative to said rotary drum body for positionally adjusting the respective head in directions generally parallel with said central axis; and
    an adjustment member for each said head mounting portion carried by said rotary drum body and movable relative to said rotary drum body in directions also substantially parallel to said central axis to act on the respective head mounting portion at a location spaced from the respective fulcrum by a second distance which is substantially greater than said first distance, whereby relatively large movements of said adjustment member can effect relatively fine positional adjustments of the respective head.

2. A rotary head drum arrangement as in claim 1; in which said head base member is formed of a plate spring material.

3. A rotary head drum arrangement as in claim 1; in which said fulcrum for each said head mounting portion is located between said respective head and said location at which the respective adjustment member acts on said respective head mounting portion.

4. A rotary head drum arrangement as in claim 1; further comprising at least another head; and in which said head base member includes a central portion engaged by said means for securing said head base member on said rotary drum body, converging arms connected to said central portion and having adjacent ends to which said one head and said other head are respectively secured, and an inverted Y-shaped slot separating said adjacent ends of said arms from each other and from said central portion so that said converging arms constitute the head mounting portions for said one head and said other head, respectively.

5. A rotary head drum arrangement as in claim 4; in which said head base member is symmetrical about a radius of said rotary drum body extending from said central axis through said means for securing the head base member on the rotary drum body.

6. A rotary head drum arrangement as in claim 1; further comprising at least another head, and at least another head base member as aforesaid for said other head and being secured on said rotary drum body so as to project said other head slightly beyond said outer circumferential surface at a position therealong spaced substantially from said one head.

7. A rotary head drum arrangement as in claim 1; in which said rotary drum body includes an annular wall portion defining said circumferential surface and having a cutout for the extension of each said head therethrough, a base wall portion extending to said annular wall portion and having a first recess communicating with said cutout of said annular wall portion, and a second recess in said base wall portion for each said head mounting portion and being separated from said first recess by an intervening ridge constituting said fulcrum for the respective head mounting portion.

8. A rotary head drum arrangement as in claim 1; in which each said adjustment member is a screw member threadably engaged with said drum body and having an end bearing against the respective head mounting portion at said location.

* * * * *